(12) United States Patent
Weingard

(10) Patent No.: US 8,781,943 B2
(45) Date of Patent: Jul. 15, 2014

(54) METHOD AND SYSTEM FOR OFFSET MATCHING

(75) Inventor: Mark Andrew Weingard, Lugano (CH)

(73) Assignee: ICAP Management Services Limited, London (GB)

( * ) Notice: Subject to any disclaimer, the term of this patent is extended or adjusted under 35 U.S.C. 154(b) by 0 days.

(21) Appl. No.: 11/744,403

(22) Filed: May 4, 2007

(65) Prior Publication Data

US 2008/0275807 A1 Nov. 6, 2008

(51) Int. Cl.
*G06Q 40/00* (2012.01)
(52) U.S. Cl.
USPC ............................................. 705/37; 705/35
(58) Field of Classification Search
USPC ........................................................ 705/37
See application file for complete search history.

(56) References Cited

U.S. PATENT DOCUMENTS

| | | | |
|---|---|---|---|
| 6,317,727 B1 | 11/2001 | May | |
| 6,421,653 B1 | 7/2002 | May | |
| 6,996,540 B1 | 2/2006 | May | |
| 7,636,683 B1 * | 12/2009 | Mills et al. ...................... | 705/37 |
| 2002/0019625 A1 | 2/2002 | Azar | |
| 2002/0091625 A1 | 7/2002 | Blauvelt et al. | |
| 2003/0083973 A1 * | 5/2003 | Horsfall .......................... | 705/37 |
| 2003/0093360 A1 | 5/2003 | May | |
| 2003/0220868 A1 | 11/2003 | May | |
| 2003/0229571 A1 | 12/2003 | May | |
| 2004/0015430 A1 | 1/2004 | May | |
| 2004/0015431 A1 | 1/2004 | May | |
| 2006/0095363 A1 | 5/2006 | May | |
| 2007/0011079 A1 * | 1/2007 | May .............................. | 705/37 |
| 2009/0182658 A1 | 7/2009 | Lutnick et al. | |

OTHER PUBLICATIONS

Finance Trainer, "Money Market Futures", Apr. 24, 2006, www.financetrainer.com.*
Risk, Prebon launches online FRA matching system, Incisive Media Investments Ltd, dated Mar. 26, 2002, downloaded from Internet on Jul. 10, 2007 at http://www.risk.net/public/showPagehtml?page=printer_friendly_risknet&print=2630.
Risk, Prebon Yamane launches py mach for Singapore dollar, , Incisive Media Investments Ltd, dated Oct. 30, 2002, downloaded from Internet on Jul. 10, 2007 at http://www.risk.net/public/showPagehtml?page=printer_friendly_risknet&print=7750.
Pain, Derek, Stock Market Week: New electronic broker plugs in, The Independent, dated Sep. 21, 1998, downloaded from Internet on Jul. 10, 2007 at http://findarticles.com/p/articles/mi_gn4158/is_19980921/ai_n14173885.

(Continued)

*Primary Examiner* — Robert R Niquette
*Assistant Examiner* — Irene Kang
(74) *Attorney, Agent, or Firm* — Dickstein Shapiro LLP

(57) ABSTRACT

The trading of interest rate swaps or other interest rate derivatives gives rise to mismatch exposure. This can be offset by a series of FRA trades. Rather than conducting a series of exposure neutral trades, FRAs can be bought or sold for the entire amount of a trader's reset exposure. To hedge the offset trades, a series of IMM FRA trades are conducted. The relative size of the IMM contracts will be determined by the distance in time from the IMM quarterly contract settlement date. A system is disclosed for performing offset trades and IMM hedges. The embodiments allow for non-neutral trading and subsequent hedging brings trading back to a neutral position.

50 Claims, 12 Drawing Sheets

| | 6m | Offset |
|---|---|---|
| D1 | 2Bn | -2Bn |
| D2 | 600 | -600 |
| D3 | -500 | 500 |
| D4 | -700 | 700 |
| D5 | 400 | -400 |
| Total | 1800 | -1800 |

(56) References Cited

OTHER PUBLICATIONS

ITG's POSIT Stock Crossing System Adds Moring Session, Business Wire, dated Mar. 21, 2001, downloaded from Internet on Jul. 10, 2007 at http://findarticles.com/p/articles/mi_m0EIN/is_2001_March_21/ai_71941706.

EDGAR Online, Investment Technology Group Inc—ITG Annual Report (10-K) Item 1, filed Mar. 31, 1997, downloaded from Internet on Jul. 10, 2007 at http://sec.edgar-online.com/1997/03/31/00/0000950123-97-002867/Section2.asp.

Risk, Icap launches reset risk competitor to Switchfix, dated Feb. 1, 2002, downloaded from Internet on Jul. 10, 2007 at http://www.risk.net/public/showPage.html?page=printer_friendly_risknet&print=1586.

Reset, ICAP, downloaded from Internet on Mar. 22, 2007 at http://www.reset.net.

FT.com Financial Times; Special reports/FT IT, Electronic Trading Projects—Ways to Enhance Voice-Broking Services, Apr. 3, 2002, downloaded from Internet on Mar. 21, 2007 at http://specials.ft.com/ftit/april2002/FT34I6U0HZC.html.

Finextra: CME and Tullett launch TLfast clearing tool, dated Jul. 7, 2004, downloaded from Internet on Mar. 21, 2007 at http://www.finextra.com/fullstory.asp?id=12130.

Reset Management brochure.

ITG Investment Technology Group, ITC Inc.—POSIT®, downloaded from Internet on Oct. 7, 2007 at http://www.itg.com/offerings/postit.php.

New Zealand Examination Report for Patent Application No. 554949 dated May 9, 2007.

\* cited by examiner

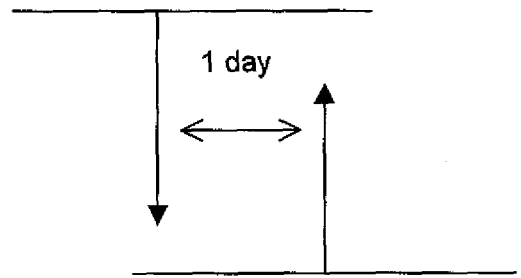
Figure 4
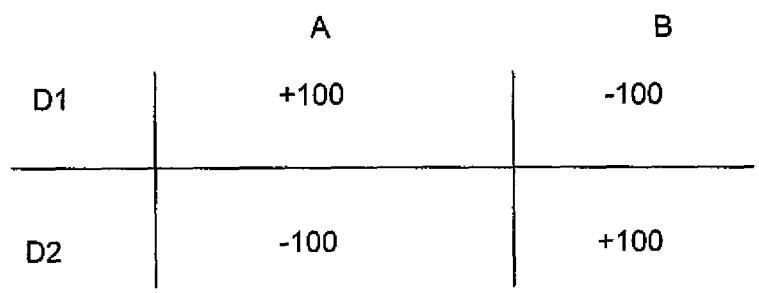
Figure 5
|    | 3m   | 6m    | 9m | 12m |
|----|------|-------|----|-----|
| D1 | +500 | +2000 |    |     |
| D2 | -600 | +600  |    |     |
| D3 | -700 | -500  |    |     |
| D4 | -    | -700  |    |     |
| D5 | -600 | +400  |    |     |
Figure 6

|    | 6m   | Offset | Balance |
|----|------|--------|---------|
| D1 | 2Bn  | -500   | 1.5 Bn  |
| D2 | 600  | -      | 600     |
| D3 | -500 | +500   | -       |
| D4 | -700 | +300   | -400    |
| D5 | 400  | -300   | 100     |
|    | 1800 |        | 1800    |

|       | 6m   | Offset |
|-------|------|--------|
| D1    | 2Bn  | -2Bn   |
| D2    | 600  | -600   |
| D3    | -500 | 500    |
| D4    | -700 | 700    |
| D5    | 400  | -400   |
| Total | 1800 | -1800  |

Figure 13

| RESET | 31-Oct-06 GBP |
|---|---|

The following options will restrict my trades

Turns
Please do not match over the following turn(s)
☐ December

Meeting Dates
Please do not match over the following Central Bank meeting dates
☐ 09-Nov-2006   ☐ 07-Dec-2006   ☐ 11-Jan-2007

Special Reset Dates
Please do not match over the following Special Reset Dates. A selected date is included in the group of dates before it

| day ▼ month ▼ year ▼ | day ▼ month ▼ year ▼ | day ▼ month ▼ year ▼ |
| day ▼ month ▼ year ▼ | day ▼ month ▼ year ▼ | day ▼ month ▼ year ▼ |

Business Day Window
I would like to restrict my Business Day window for matching purposes to the following   120   days

Stub Management
Please limit my stub to   unlimited ▼   three month futures equivalents   ☑ Merge for all Portfolios that I submit for this Run

Special Instructions
☐ Do not match portfolios internally within my bank   ☐ Do not match across my portfolios

Figure 14

31-Oct-06 GBP

| COUNTERPARTY NAME | ,000,000 |
|---|---|
| ABBEY NATIONAL FINANCIAL PRODUCTS - LDN | ,000,000 |
| ABN AMRO BANK NV - LDN | ,000,000 |
| AIG FINANCIAL PRODUCTS CORPORATION WILTON - CONN | ,000,000 |
| BANK OF AMERICA NA - CHAR | ,000,000 |
| BANK OF MONTREAL - LDN | ,000,000 |
| BANK OF TOKYO MITSUBISHI UFJ LIMITED - TOK | ,000,000 |
| BARCLAYS BANK PLC - LDN | ,000,000 |
| BAYERISCHE LANDESBANK - LDN | ,000,000 |
| BEAR STEARNS CAPITAL MARKETS INC - NYK | ,000,000 |
| BNP PARIBAS SA - PAS | ,000,000 |
| CALYON - PAS | ,000,000 |
| CANADIAN IMPERIAL BANK OF COMMERCE - LDN | ,000,000 |
| CITIBANK NA - LDN | ,000,000 |
| COMMERZBANK AG - FFT | ,000,000 |
| CREDIT SUISSE INTERNATIONAL - LDN | ,000,000 |
| DEUTSCHE BANK AG - FFT | ,000,000 |
| DEUTSCHE BANK AG - LDN | ,000,000 |
| DEUTSCHE ZENTRAL GENOSSENSCHAFTSBANK - FFT | ,000,000 |
| DEXIA BANK BELGIUM SA - BXLS | ,000,000 |
| DRESDNER BANK AG - FFT | ,000,000 |
| GOLDMAN SACHS CAPITAL MARKETS NYK - NYK | ,000,000 |
| HBOS TREASURY SERVICES - LDN | ,000,000 |
| HSBC BANK PLC - LDN | ,000,000 |
| ING BANK NV - ADAM | ,000,000 |
| ING BELGIUM SA/NV - BXLS | ,000,000 |
| JP MORGAN CHASE BANK - LDN | ,000,000 |
| LANDESBANK BERLIN AG - BERL | ,000,000 |
| LEHMAN BROS SPECIAL FINANCE INCORPORATED - NYK | ,000,000 |
| LLOYDS TSB PLC FINANCIAL MARKETS - LDN | ,000,000 |
| MERRILL LYNCH CAPITAL SERVICES INCORPORATED NEW YORK - NYK | ,000,000 |
| MITSUBISHI UFJ SECURITIES INTERNATIONAL PLC - LDN | ,000,000 |
| MIZUHO CAPITAL MARKETS CORPORATION - NYK | ,000,000 |
| MORGAN STANLEY CAPITAL SERVICES INCORPORATED - NYK | ,000,000 |
| NATEXIS BANQUE POPULAIRES - PAS | ,000,000 |
| NATIONAL AUSTRALIA BANK LIMITED - LDN | ,000,000 |
| NOMURA GLOBAL FINANCIAL PRODUCTS - NYK | ,000,000 |
| NORDEA BANK FINLAND PLC - HKI | ,000,000 |
| ROYAL BANK OF CANADA - LDN | ,000,000 |
| ROYAL BANK OF SCOTLAND FINANCIAL MARKETS - LDN | ,000,000 |
| SMBC CAPITAL MARKETS INC - NYK | ,000,000 |
| SOCIETE GENERALE - PAS | ,000,000 |
| STANDARD BANK - LDN | ,000,000 |
| STANDARD BANK OF SOUTH AFRICA LIMITED (THE) - JBG | ,000,000 |
| STANDARD CHARTERED BANK - LDN | ,000,000 |
| SWISS RE FINANCIAL PRODUCTS - NYK | ,000,000 |
| TORONTO DOMINION BANK - TOR | ,000,000 |
| UBS AG - LDN | ,000,000 |
| UBS AG - ZUR | ,000,000 |
| WESTLB AG - LDN | ,000,000 |

Figure 15

RESET

31-Oct-06 GBP

1 MONTH LIBOR POSITIONS

| TRADER A | | | | A |
|---|---|---|---|---|

Use "+" to sell the FRA (receive fixed)   Use "-" to buy the FRA (pay fixed)

| Reset Date | Value Date | Maturity Date | Yield | Input Your GBP Positions Here |
|---|---|---|---|---|
| 2-Nov-2006 | 2-Nov-2006 | 4-Dec-2006 | 4.0000 | 0,000,000 |
| 3-Nov-2006 | 3-Nov-2006 | 4-Dec-2006 | 4.0047 | 0,000,000 |
| 6-Nov-2006 | 6-Nov-2006 | 6-Dec-2006 | 4.0094 | 0,000,000 |
| 7-Nov-2006 | 7-Nov-2006 | 7-Dec-2006 | 4.0142 | 0,000,000 |
| 8-Nov-2006 | 8-Nov-2006 | 8-Dec-2006 | 4.0189 | 0,000,000 |
| 9-Nov-2006 | 9-Nov-2006 | 11-Dec-2006 | 4.0236 | 0,000,000 |
| 10-Nov-2006 | 10-Nov-2006 | 11-Dec-2006 | 4.0283 | 0,000,000 |
| 13-Nov-2006 | 13-Nov-2006 | 13-Dec-2006 | 4.0330 | 0,000,000 |
| 14-Nov-2006 | 14-Nov-2006 | 14-Dec-2006 | 4.0377 | 0,000,000 |
| 15-Nov-2006 | 15-Nov-2006 | 15-Dec-2006 | 4.0425 | 0,000,000 |
| 16-Nov-2006 | 16-Nov-2006 | 18-Dec-2006 | 4.0472 | 0,000,000 |
| 17-Nov-2006 | 17-Nov-2006 | 18-Dec-2006 | 4.0519 | 0,000,000 |
| 20-Nov-2006 | 20-Nov-2006 | 20-Dec-2006 | 4.0566 | 0,000,000 |
| 21-Nov-2006 | 21-Nov-2006 | 21-Dec-2006 | 4.0613 | 0,000,000 |
| 22-Nov-2006 | 22-Nov-2006 | 22-Dec-2006 | 4.0660 | 0,000,000 |
| 23-Nov-2006 | 23-Nov-2006 | 23-Dec-2006 | 4.0708 | 0,000,000 |
| 24-Nov-2006 | 24-Nov-2006 | 27-Dec-2006 | 4.0755 | 0,000,000 |
| 27-Nov-2006 | 27-Nov-2006 | 27-Dec-2006 | 4.0802 | 0,000,000 |
| 28-Nov-2006 | 28-Nov-2006 | 28-Dec-2006 | 4.0849 | 0,000,000 |
| 29-Nov-2006 | 29-Nov-2006 | 29-Dec-2006 | 4.0896 | 0,000,000 |
| 30-Nov-2006 | 30-Nov-2006 | 29-Dec-2006 | 4.0943 | 0,000,000 |
| 1-Dec-2006 | 1-Dec-2006 | 2-Jan-2007 | 4.0991 | 0,000,000 |
| 4-Dec-2006 | 4-Dec-2006 | 4-Jan-2007 | 4.1038 | 0,000,000 |
| 5-Dec-2006 | 5-Dec-2006 | 5-Jan-2007 | 4.1085 | 0,000,000 |
| 6-Dec-2006 | 6-Dec-2006 | 8-Jan-2007 | 4.1132 | 0,000,000 |
| 7-Dec-2006 | 7-Dec-2006 | 8-Jan-2007 | 4.1179 | 0,000,000 |
| 8-Dec-2006 | 8-Dec-2006 | 8-Jan-2007 | 4.1226 | 0,000,000 |
| 11-Dec-2006 | 11-Dec-2006 | 11-Jan-2007 | 4.1274 | 0,000,000 |
| 12-Dec-2006 | 12-Dec-2006 | 12-Jan-2007 | 4.1321 | 0,000,000 |
| 13-Dec-2006 | 13-Dec-2006 | 13-Jan-2007 | 4.1368 | 0,000,000 |
| 14-Dec-2006 | 14-Dec-2006 | 15-Jan-2007 | 4.1415 | 0,000,000 |
| 15-Dec-2006 | 15-Dec-2006 | 15-Jan-2007 | 4.1462 | 0,000,000 |
| 18-Dec-2006 | 18-Dec-2006 | 18-Jan-2007 | 4.1509 | 0,000,000 |
| 19-Dec-2006 | 19-Dec-2006 | 19-Jan-2007 | 4.1557 | 0,000,000 |
| 20-Dec-2006 | 20-Dec-2006 | 22-Jan-2007 | 4.1604 | 0,000,000 |
| 21-Dec-2006 | 21-Dec-2006 | 22-Jan-2007 | 4.1651 | 0,000,000 |
| 22-Dec-2006 | 22-Dec-2006 | 22-Jan-2007 | 4.1698 | 0,000,000 |
| 27-Dec-2006 | 27-Dec-2006 | 29-Jan-2007 | 4.1745 | 0,000,000 |
| 28-Dec-2006 | 28-Dec-2006 | 29-Jan-2007 | 4.1792 | 0,000,000 |
| 29-Dec-2006 | 29-Dec-2006 | 31-Jan-2007 | 4.1840 | 0,000,000 |
| 2-Jan-2007 | 2-Jan-2007 | 2-Feb-2007 | 4.1887 | 0,000,000 |
| 3-Jan-2007 | 3-Jan-2007 | 5-Feb-2007 | 4.1934 | 0,000,000 |
| 4-Jan-2007 | 4-Jan-2007 | 5-Feb-2007 | 4.1981 | 0,000,000 |
| 5-Jan-2007 | 5-Jan-2007 | 5-Feb-2007 | 4.2028 | 0,000,000 |
| 8-Jan-2007 | 8-Jan-2007 | 8-Feb-2007 | 4.2075 | 0,000,000 |
| 9-Jan-2007 | 9-Jan-2007 | 9-Feb-2007 | 4.2123 | 0,000,000 |
| 10-Jan-2007 | 10-Jan-2007 | 12-Feb-2007 | 4.2170 | 0,000,000 |
| 11-Jan-2007 | 11-Jan-2007 | 12-Feb-2007 | 4.2217 | 0,000,000 |
| 12-Jan-2007 | 12-Jan-2007 | 12-Feb-2007 | 4.2264 | 0,000,000 |
| 15-Jan-2007 | 15-Jan-2007 | 15-Feb-2007 | 4.2311 | 0,000,000 |
| 16-Jan-2007 | 16-Jan-2007 | 16-Feb-2007 | 4.2358 | 0,000,000 |

FIG. 16A

| 17-Jan-2007 | 17-Jan-2007 | 19-Feb-2007 | 4.2406 | 0,000,000 |
| 18-Jan-2007 | 18-Jan-2007 | 19-Feb-2007 | 4.2453 | 0,000,000 |
| 19-Jan-2007 | 19-Jan-2007 | 19-Feb-2007 | 4.2500 | 0,000,000 |
| 22-Jan-2007 | 22-Jan-2007 | 22-Feb-2007 | 4.2547 | 0,000,000 |
| 23-Jan-2007 | 23-Jan-2007 | 23-Feb-2007 | 4.2594 | 0,000,000 |
| 24-Jan-2007 | 24-Jan-2007 | 26-Feb-2007 | 4.2642 | 0,000,000 |
| 25-Jan-2007 | 25-Jan-2007 | 26-Feb-2007 | 4.2689 | 0,000,000 |
| 26-Jan-2007 | 26-Jan-2007 | 26-Feb-2007 | 4.2736 | 0,000,000 |
| 29-Jan-2007 | 29-Jan-2007 | 28-Feb-2007 | 4.2783 | 0,000,000 |
| 30-Jan-2007 | 30-Jan-2007 | 28-Feb-2007 | 4.2830 | 0,000,000 |
| 31-Jan-2007 | 31-Jan-2007 | 28-Feb-2007 | 4.2877 | 0,000,000 |

FIG. 16B

METHOD AND SYSTEM FOR OFFSET MATCHING

FIELD OF THE INVENTION

This invention relates to methods and systems for hedging positions arising from offset matches in trades such as interest rate swaps which give rise to an unpredictable risk over a long period of time.

BACKGROUND OF THE INVENTION

In the interest swaps markets, it is commonplace to hedge mismatches using a reset system which reduces outstanding fixing risk. Reset systems buy and sell FRAs (Forward Rate Agreements). Known reset systems include FRA-Cross operated by ICAP Europe plc. FRA-Cross offers traders the possibility of reducing floating rate mismatch risk arising from interest rate swaps and other trades. A further known system is Tlfast, operated jointly by Tullet Liberty Securities and Chicago Mercantile Exchange. This system offsets with daily expiring 3-month futures trades rather than FRAs.

Whilst the known systems provide a degree of risk exposure management, we have appreciated that it is desirable to increase the amount of risk that can be offset through the reset process.

SUMMARY OF THE INVENTION

The invention aims to provide a method and system which can provide improved risk management. One aspect of the invention provides a computerised method of reducing risk in derivative trades. The method comprises the steps of: identifying positions to be matched; and unilaterally performing a set of first offset trades to match the identified positions. A hedge is performed on the overall net position by performing a series of at least two corresponding FRA trades having a fixed settlement date. Such a hedge may be a series of IMM FRA trades.

Preferably, the unilateral offset trades are forward rate agreement (FRA) trades. The FRA trades may be offset matches corresponding to positions entered by a trader. Preferably, the IMM trades are calculated with reference to the date of the position to be hedged and the expiry date of IMM contracts, wherein two IMM contracts are traded in a ratio determined by the number of days between the expiry date of the position to be hedged and adjacent IMM settlement dates The positions to be hedged may result from mismatches in interest rate swap trades or any other instrument that uses reset. This may include interest rate options and FRA trading and other swaps markets.

A second aspect of the invention provides a computerised method for reset matching. The method comprises receiving positions to be matched from traders. The positions are matched at a match time by unilaterally performing an offset sale or purchase of a FRA corresponding to each position. The offset FRA trades are hedged by performing a series of two or more IMM trades.

Preferably, the method further comprises notifying traders of the unilateral matches and the IMM trades.

A third aspect of the invention provides a computer readable storage medium having instructions stored thereon which, when run on a computer, cause the computer to perform the steps of: receiving positions to be matched from a trader; unilaterally performing a set of offset trades to match the received positions; and performing a series of hedges on the unilateral offset trades by performing at least two hedge trades having a fixed settlement date in a FRA market.

A further aspect of the invention provides a computer readable storage medium having instructions stored thereon which, when run on a computer programmed to perform reset matching, cause the computer to perform the steps of: receiving positions to be matched from traders; matching the positions by unilaterally performing an offset sale or purchase of a FRA corresponding to each matched position; and hedging the net position resulting from the offset FRA trades by performing a series of two or more IMM trades.

A still further aspect of the invention provides a computerised trading system for reducing risk generated by derivative trades, in which traders input positions to be matched into the system, comprising: a matching engine for matching positions input from a plurality of trader input devices and unilaterally performing a set of first offset trades to match the identified positions; and a hedge trading engine for performing a series of two or more hedge trades on the net offset position by performing a series of FRA trades having a fixed settlement date.

A yet further aspect of the invention provides a computerised trading system for reset matching, comprising: a matching engine for matching positions received from traders at a match time by unilaterally performing an offset sale or purchase of a FRA corresponding to each matched position; and a hedge engine for hedging the offset FRA trades by calculating and performing a series of IMM trades, wherein the net offset FRA position is hedged by at least two IMM FRA trades.

Embodiments of the invention have the advantage that offset trades can be performed which fully offset the traders' positions without the need for the offset trades to remain neutral. This is made possible by the use of FRA trades having a fixed settlement date, preferably IMM trades, which are used to hedge the net offset position. In most cases, two IMM contracts will be traded, one for the contract before the offset date and one for the period after. The relative size of the two contracts will depend on the proximity of the IMM contract date to the offset date. The IMM FRA market is extremely liquid making it an ideal vehicle for the hedge. Embodiments of the invention have the advantage that they enable traders to offset risk, for example generated from interest rate swap mismatches or other mismatches, more completely than is possible with prior art methods and systems. Embodiments of the invention have the further advantage of allowing for non-neutral trading with subsequent hedging bringing trading back to a neutral position.

BRIEF DESCRIPTION OF DRAWINGS

Embodiments of the invention will now be described, by way of example only, and with reference to the accompanying drawings, in which:

FIG. 4 illustrates the payment mismatch window for the interest rate swaps of FIGS. 1 and 3;

FIG. 5 shows the cash flows for traders A and B in the trades illustrated in FIGS. 1 and 3;

FIG. 6 shows a reset ladder for a number of days;

FIG. 13 is an input form for a trader using the system and method embodying the present invention;

FIG. 14 is a further input form for a trader using the system and method embodying the present invention;

FIG. 15 shows credit limits for trades with third parties input by a trader to the system;

FIG. 16 A and B shows an example of 1 month LIBOR positions input by a trader.

DESCRIPTION OF PREFERRED EMBODIMENTS

Figure 1:
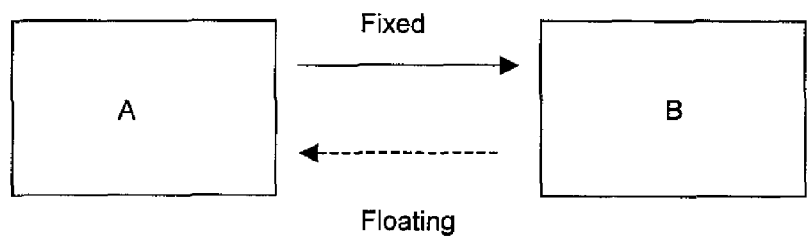
FIG. 1 is a schematic view of an interest rate swap.

In order to understand the invention it is useful to understand the nature of trading risk that can be generated by a trader's activities. One type of commonly traded derivative is the interest rate swap. A standard vanilla swap trades a fixed interest rate against a floating rate and is used to alter exposure to interest rate fluctuations. FIG. 1 shows an example of an interest rate swap in which party A agrees to pay party B periodic interest payments at a fixed rate of, say, 4.5% at regular intervals, for example every year, over an agreed period of time. In return, party B pays party A a floating interest rate which is determined with reference to an interest standard rate such as LIBOR (London InterBank Offered Rate) for a sterling swap or EURIBOR (Euro Interbank Offered Rate) for a Euro denominated swap. Under the terms of the contract, A will pay B annually and B will pay A every six months throughout the lifetime of the contract. The value of B's payments to A will depend on the LIBOR, EURIBOR or other reference rate at the time the payment becomes due. There is no transfer of the underlying capital on which the interest is payable.

Figure 2:
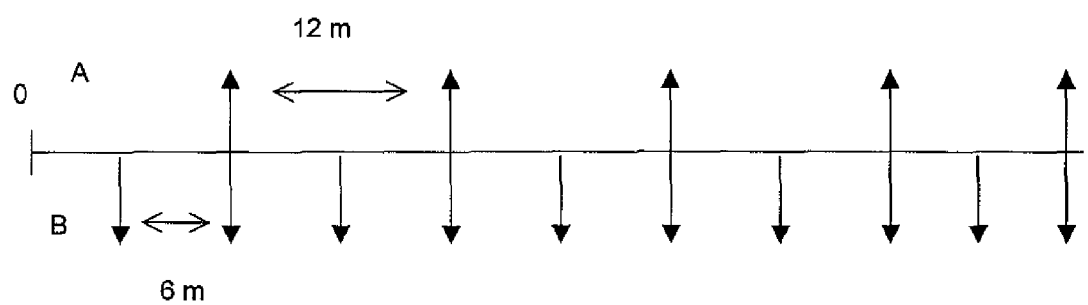
FIG. 2 shows the schedule of payments for a 5 year interest rate swap.

FIG. 2 illustrates the flow of payments between the parties over the term of the contract. Time is shown as the horizontal axis and payments from A→B are shown extending vertically upwards every 12 months and payments from B→A extending vertically downwards every 6 months. The first floating rate payment will be known when the deal is made, for example it will be calculated at the published 6 m LIBOR or EURIBOR rate but the remaining repayments will not be known. In practice, these payments are determined by resetting or fixing the deal rate two days before the 6 month date or on the date depending on the denomination of the rate.

Figure 3:
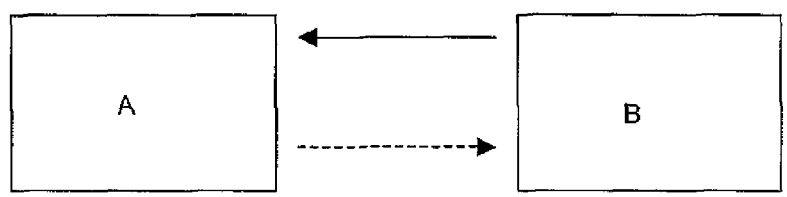
FIG. 3 is a schematic view of a reverse direction interest rate swap to that of FIG. 1.

A trader will enter into many deals over a trading day and will have a large number of open deals at any one time. Consider the case where the two traders A and B enter into an opposite deal to that of figure the next day, as illustrated in FIG. 3. Here, trader B pays a fixed rate to trader A and trader A pays a floating rate to trader B. The fixed interest rate may have changed since the previous day, say from 4.5% to 4.6%. In that case, each time a fixed rate payment is made trader B pays out 0.1% more to trader A that he received on the corresponding trade on the previous day.

FIG. 4 shows how the payments on the two deals fall for the floating part of the deal. The traders can predict the amount they will make or lose on each leg of the deal. However, for the floating deals, the amount is less quantifiable. Although the first amount is known (eg 6 m LIBOR), the other 9 payments payable over the 5 years period of the deal are unquantifiable. Thus, there is a mismatch between the two deals which exists throughout the lifetime of the deal and which exposes the traders to risk. This mismatch arises through the time difference between the deals between the two parties. There would be no mismatch if the two deals had been done on the same day.

It would be possible for the traders to hedge out all the cash flows that are generated by these trades. This could be done by buying a series of FRAs (forward rate agreements) to hedge up each mismatch. However, the prices offered for FRA trades towards the end of the deal will be very poor and this is an unattractive option to the trader.

Systems exist which enable traders to hedge out their reset risk efficiently and cheaply. These systems buy and sell mismatches. One known system is FRA-Cross which was operated by ICAP Europe Ltd. In this system every few weeks, a matching run is performed for each currency on the system. The frequency depends on the currency of the FRA with US$ being matched every week, EUR, JPY and GBP every two weeks, and smaller currencies every three weeks. Positions are entered into the systems by traders manually or by pasting from spreadsheets.

FIG. 5 shows how the traders A and B would need to hedge out the two trades discussed above using a reset system. FIG. 5 shows the amounts of each trade to have been 100 million. On day 1, trader A is 100 m long and on day 2 100 m short. It is the other way round for trader B. Trader A thus needs to buy on day 1 and sell on day 2 to hedge out his positions. As mentioned above, this can be done by buying a FRA for 100 m on day 1 and selling it on day 2.

Figures 7, 8, 9:
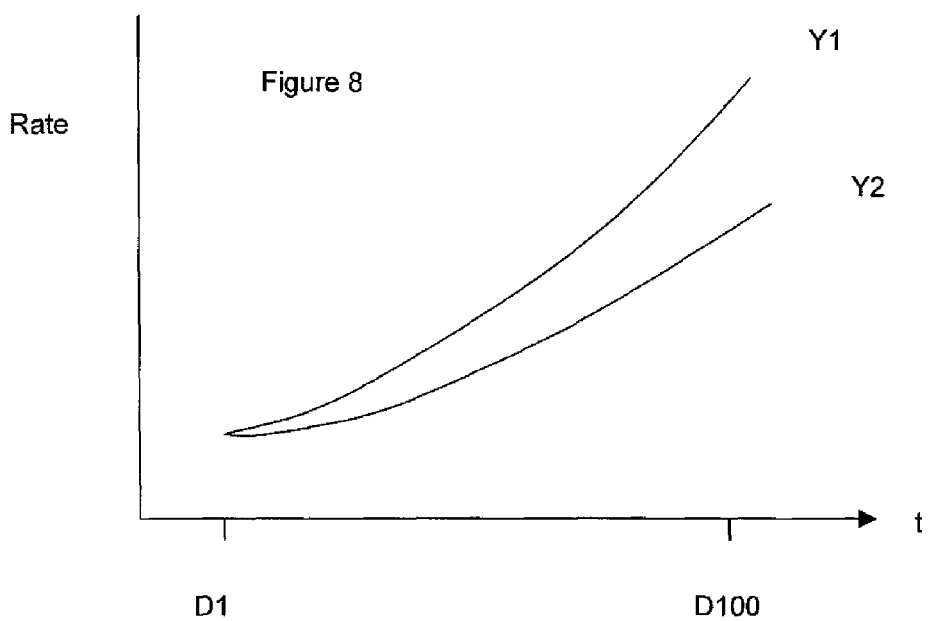
FIG. 7 shows how the exposures of FIG. 5 may be hedged by offset trades.
FIG. 8 shows yield curves over a 100 day period.
FIG. 9 shows how offset trades may be increased according to an embodiment of the present invention.

The two deals described have been taken in isolation to explain the nature of the mismatch risk which arises, for example, from interest rate swap trades. As traders execute many deals, they will expose themselves on a large number of deals and can construct a table of cash flows that will become due in the future. FIG. 6 shows an example of such a table known as a reset ladder. The table shows the mismatch exposure for each tenor. In this example, only 3 month and 6 month tenors are shown populated but it can seen that in the 6 month column the trader is 2 billion long on day 1; 600 m long on day 2; 500 m short on day 3; 700 m short on day 4; and 400 m long on day 5. Overall the trader is 1800 m long over the 5 day period. Similarly, for the 3 m tenor the trader is 1400 m short over the 5 day period. Reset systems work by changing the individual exposure without changing the overall exposure. The intention is to balance, as far as possible, the long and short positions on individual days by making long positions shorter and vice versa, without affecting the overall position. The reset system performs offsetting trades so reducing exposure to interest rate changes. An example of the trades that might be done is shown in FIG. 7. Here the offsets are calculated only for the 6 m tenor. It must be remembered that the overall exposure cannot be changed over the period. That period is not fixed and is, in practice, defined by the customer. Thus, in FIG. 7, an offset trade of −500 m (a sell) is performed on day 1; a buy for 500 m is performed on day 3, a buy for 300 m on day 4 and a sell for 300 on day 5. The net offset over the 5 day period is zero and the balance is the same 1.8 BN as before, but it can be seen from FIG. 7 that the individual exposure on each day is less than, or equal to the exposure before the offset was applied. In the example given, the exposure on day 2 is the same but is significantly reduced on all other days. For any given movement in interest rate, the effect on the position is less than before the offset was applied.

The reset matching process operates on the basis of buying and selling FRAs. It is important that the offset process is kept neutral. In other words the traders buy and sell the same amounts. This is illustrated in FIG. 7 in which a FRA for 500 m is sold on day 1 and bought on day 3 and a FRA for 300 m is bought on day 4 and sold on day 5. It is also not guaranteed that all the reset trades, the trader seeks to make will be filled.

However, the process of buying and selling FRAs can give rise to yield curve risk. Curve risk may be understood from FIG. 8 and is a particular problem when FRAs are bought and sold a distance in time apart. The yield curve shows expectations of the interest rate, and thus the cost of borrowing, over time. In the example shown at FIG. 8, Y1 represents the curve published for Reset. Every date has a rate and the curve is fixed daily. By the next day the market has moved. Curve Y2 represents the market's new expectations. As can be seen, the longer the term, the greater the disparity between curves Y1 and Y2 and so the greater the curve risk. In the FIG. 8 example there is a great disparity between the rates predicted by curves Y1 and Y2 at a distant time D100 which represent a considerable risk.

The risk involved may be mitigated by buying International Monetary Market IMM FRAs. This is a hedging process which cushions against risk. The FRAs are opposite to the underlying trade so that a buy trade is hedged by selling IMM FRAs and vice versa. IMM FRAs are a very liquid traded FRA product and are similar in risk profile to interest rate IMM futures that are an exchange-traded product and can be used to hedge against curve risk. Thus, a hedge is performed which hedges the FRA trades against a series of IMM FRA contracts. IMM contracts are FRAs which have a settlement date that corresponds to the standard settlement day for futures traded at the IMM, which in the case of 3 month contracts is on the third Wednesday of March, June, September and December. The IMM trades required are calculated by the system provider based on generated curve risk and that risk is then offset with a series of IMM trades. The IMM trades always match the amount bought with the amount sold. Taking the earlier example, if D1 were, say, $31^{st}$ May, it falls between the March and the June contract dates and two IMM contracts will be bought, one expiring in March and the other in June. The amount of each contract in relation to the overall amount to be hedged may be proportionate simply to the distance to the two contract dates.

The purpose of the hedge trades is to remove risk. Going back to the offset calculation shown in FIG. 7, at D1 the offset hedge is a sell trade for 500. The IMM trades which hedge that trade will be buy trades. Similarly, the Imm hedges at D3 and D4 will be sells and at D5 a buy.

The IMM hedges thus protect the trader by eliminating curve risk and insulate against the effect of interest rate changes. By providing a series of hedges, the trader is protected by a movement in interest rates between the setting of the RESET curve and the delivery of the trades back to the trader the next day. By trading out of the fixing positions the trader is protecting himself from the movement of short term rates.

In the examples given, the offset hedging applied adhered strictly to the principle that the trader's balance over the period selected must be exactly the same after the offset hedging had been applied. Thus, in the FIG. 7 example the balance must remain at 1.8 Bn. We have appreciated that the entire book may be traded provided that it is rebalanced via hedging. Thus, as shown in FIG. 9, the offset trades are opposite and equal to the mismatch positions leaving the offset unbalanced at −1.8 Bn. The ensuing hedge trades neutralise that imbalance. As in the yield curve example, these trades are conveniently hedged by a mixture of IMM trades calculated according to the proximity of the next IMM contract date.

The effect of this additional hedge is to bring the position back to zero or near zero, so maintaining the requirement that the trader's position must be squared. This approach has the advantage that more risk is removed from the trading book. In the FIG. 7 example, only 1.6 Bn was hedged, whereas in the FIG. 9 example, 4.2 Bn can be hedged. It should be noted that the 1.6 Bn is given only as an example and that up to 2.4 Bn could have been offset. That amount is calculated as twice the smaller of the buy and sell positions, as the trader's position must be squared. The total short position is 1.2 Bn, which can be offset but the long position that can be offset is also 1.2 Bn (although the total long position is 3Bn) making a total of 2.4 Bn.

Figures 10, 10B:
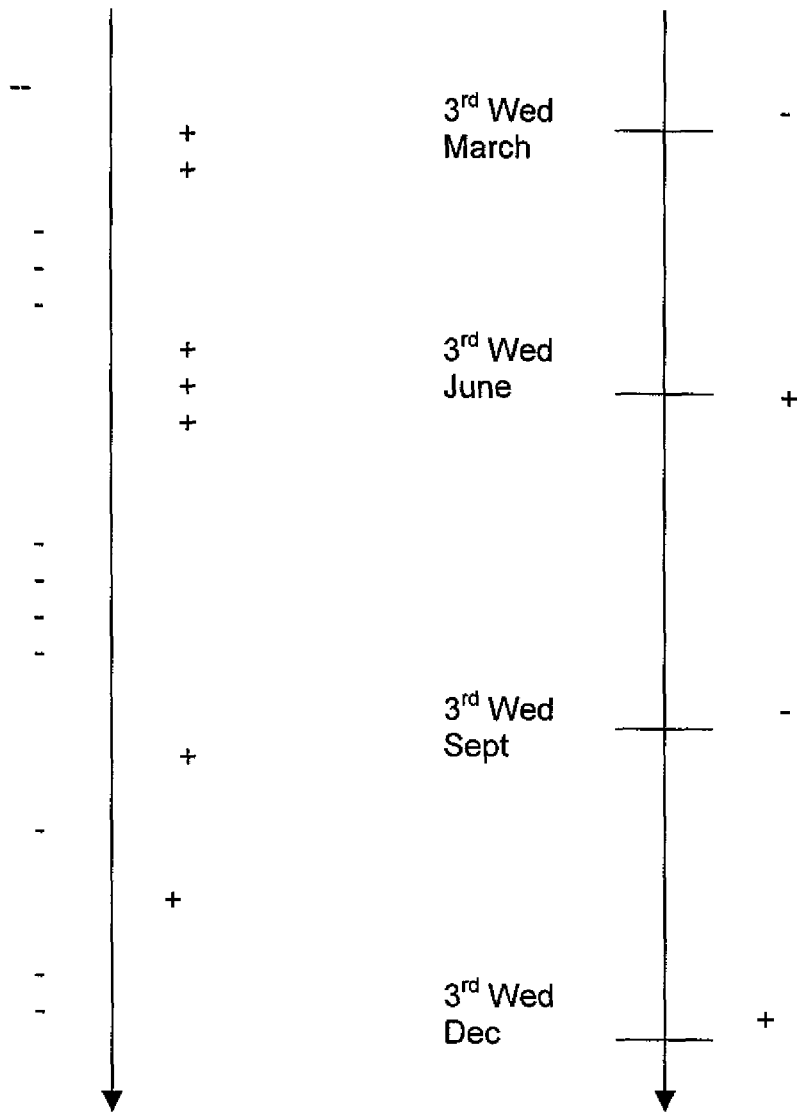
FIG. 10 shows how cash flows vary with time according to (a) prior art methods, and (b) an embodiment of the invention.

This approach of unilaterally offsetting the positions has the effect of pushing all the reset risk onto the IMM dates. Graphically, this change in risk is illustrated in FIG. 10. FIG. 10(a) shows the risk position against time descending. There are many instances in which the trader has a positive or negative exposure. The method described with respect to FIG. 9 is shown in FIG. 10(b). All the risk has been removed and moved onto the IMM dates where it is hedged in the futures market which has the advantage of being highly liquid.

The embodiment described with respect to FIGS. 9 and 10 significantly improves the effectiveness of the matching process removing more outstanding fixing risk. After trading, net long and short positions are created when positions are entered and the hedge function creates an offsetting amount to neutralise the position within reasonable parameters.

Figure 11:
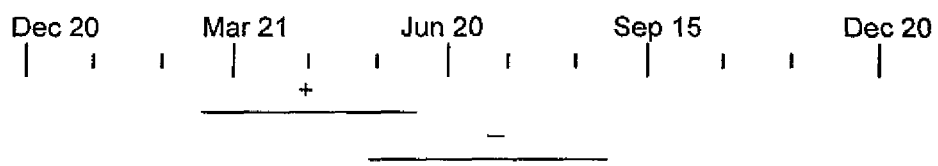
FIG. 11 shows how the IMM trades required to hedge the net offset position are calculated.

The manner in which the required IMM hedge trades are calculated may be better understood from the following worked example and FIG. 11. Here, the date is notionally 14 December and the trader has identified the need for 2 three month offset FRAs. The first is a buy for 500M with a contract date 14 Feb to 14 May, and the second is a sell with a contract date from 5 May to 6 August. The buy trade is indicated by a + symbol and the sell trade by a − symbol in FIG. 11. For the first trade, the next IMM settlement date is 21 March which is 35 days away. The fraction of the FRA period which falls within the 20 December IMM period is therefore 35/91× 500=192M. For these purposes, the total period is always treated as 91 days regardless of the actual length of time which differs slightly in some periods. The fraction of the March contract is the time between March 21 and May 14=54 days/91 days×500=296M.

Thus, to hedge the 500 Buy FRA there must be a Dec IMM sell for 192 Million and a March IMM sell for 296 Million. It will be noted that the total of the IMM trades is 488M which is not exactly equal to the amount of the FRA being hedged.

To hedge the second FRA will require March and June IMM FRAs to be bought. The amount of the March IMM required is 46 days (the time between 5 May and 20 June)/91 days×500=252 M Buy. Similarly the amount of June is 47/91×500=258 M Buy. Here, the total about bought is 510 M.

Thus there is a requirement to sell 192 Dec, to sell 296 Mar, to buy 252 Mar, and to buy 258 Jun. Thus, the net requirement is Sell 192 Dec, Sell 44 Mar and Buy 258 Jun. Over the period there is a net buy of 22 M. Prior Reset matching would require that the buy and sell amounts were equal so that the amount of the buy could only be 236 M. Thus, the embodiment described allows a further 22 M of risk to be hedged.

Figure 12:
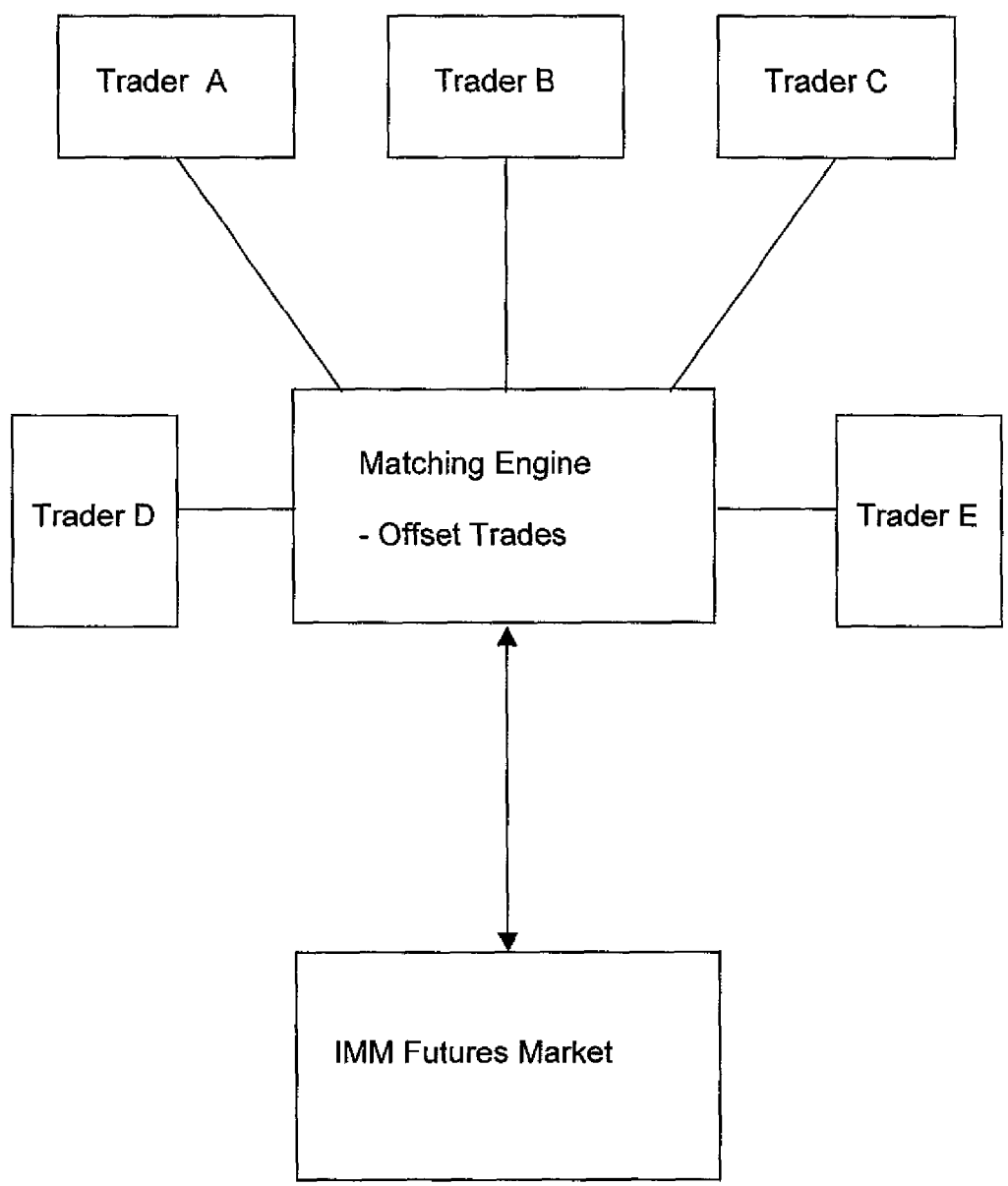
FIG. 12 is a block diagram of a networked trading system suitable for embodying the invention.
Figure 13:
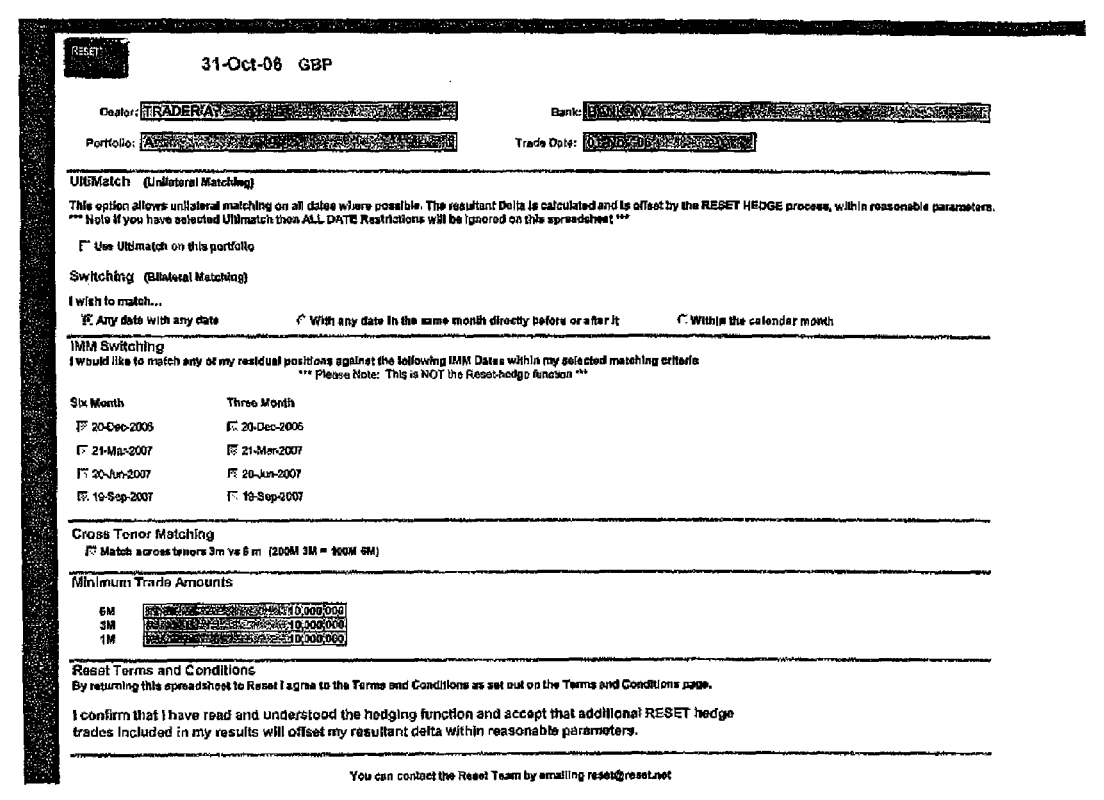
Figure 17:
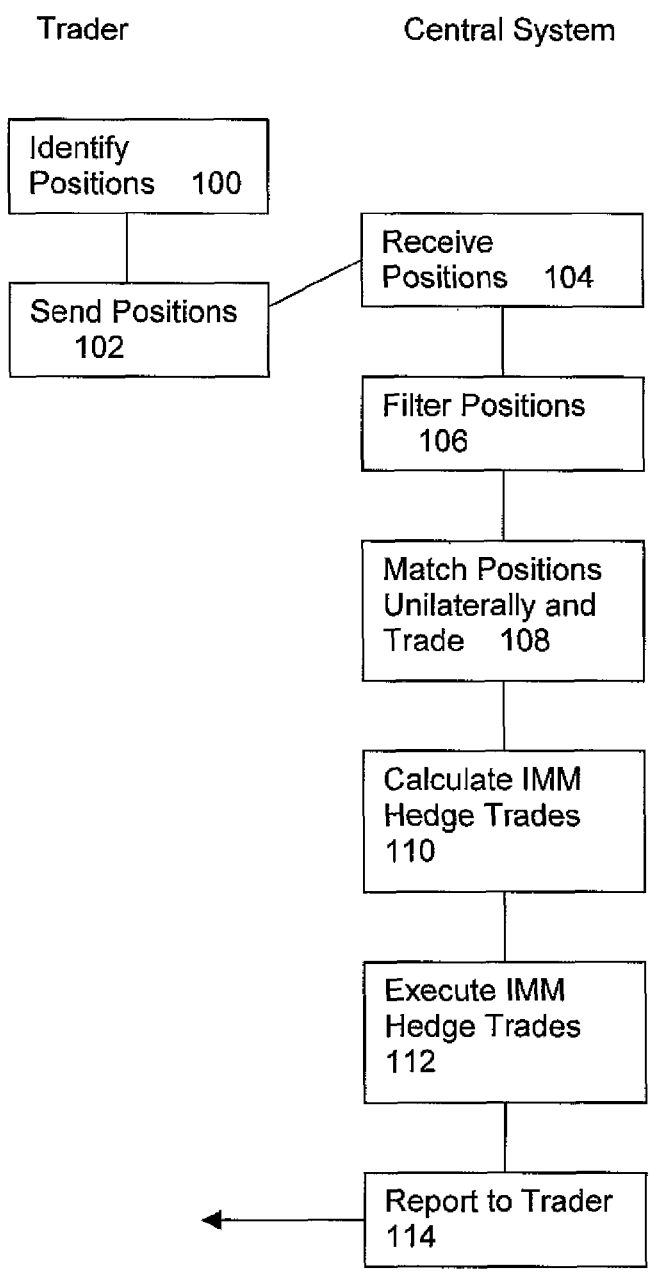
FIG. 17 is a flow chart illustrating steps followed in the execution of trades in a preferred embodiment of the invention.

The system described may be implemented as a computerised system with traders communicating with a central system via a telecommunications network such as the internet or a dedicated network. In one embodiment the positions are emailed or faxed by traders to the central system. The central system as shown in FIG. 12 receives credit limits from traders for trades with various counterparties with whom they may trade on the system. The central system matches submitted orders in accordance with these credit limits in a known manner. FIGS. 13-16 show examples of how traders enter data into the system. At FIG. 13 a trader identified as trader A at bank XYZ submits parameters which will govern the manner in which his trades will be handled by the system. This form gives the trader the opportunity to select the unilateral matching facility described with reference to FIGS. 9 and 10 by selecting the "Ultimatch" option. Alternatively, the trader can select bilateral matching in a manner conducted by known systems.

FIG. 14 shows a range of further parameters which will restrict the trades that the system will perform, including dates on which the trader does not wish reset matching to occur, which may coincide with days on which a change in interest rates is likely.

FIG. 15 shows a spreadsheet allowing the trader to enter credit limits for each possible counterparty with which they might be matched by the system. If the trader does not enter a credit limit for a particular counterparty they will not be eligible for matching with that counterparty.

FIG. 16 A and B shows, for 1 m tenor sterling positions, a spreadsheet which enables the trader to enter their positions for each business day of the next three months. The position is shown in the right hand column as a number of £M with a positive entry indicating a requirement to sell a 1 m FRA and a negative entry indicating a need to buy a one month FRA on a particular day. Once the run has been completed and the matches made, the system will return to the trader a notification of all the trades made, for which the trader will be charged a brokerage fee, together with details of the counterparty with whom they have been matched. The trader is also notified of hedge trades which have been conducted on their behalf by the system. Thus, the trader receives a listing of the IMM trades against which their offset trades have been hedged.

The manner in which the system operates may be further understood from FIG. 16 A and B. At step 100, traders identify positions that they need to trade out. The traders complete a portfolio entry sheet as shown in FIG. 16 which has been sent to them electronically, for example to their e-mail address, by the system. The trader has until a stated cut-off time to submit at step 102 the portfolio entry sheet to the system. The system receives the positions in the portfolio entry sheet at step 104 and at step 106 filters the positions according to constraints entered by the trader such as parties to whom they do not extend credit and days on which they do not wish to trade, as shown in FIGS. 14 and 15. At step 108 the system matches buy and sell positions for the FRA that is being traded. As part of this step, the system matches unilaterally, that is, as described above, all possible trades are executed regardless of maintaining a neutral position. Next, at step 110, the system calculates, for the net offset position, the IMM trade or trades that are required to hedge the trade. These hedge trades are executed at step 112 and at step 114 the offset trades and the hedge trades are reported back to the trader.

Thus the system described enables traders to reduce mismatch risk by buying or selling FRAs unilaterally for the entire amount of their exposure. These FRAs are then hedged by purchasing two or more IMM FRAs. The result is a synthetic future which hedges the mismatch risk.

The embodiment described may be modified in many ways without departing from the invention which is defined in the following claims. For example, the embodiment may be used with instruments other than the vanilla interest rate swaps described. The embodiment is suitable not only for use with other types of interest rate swaps such as floating—floating swaps or any other instrument the trading of which gives rise to a mismatch resulting in an exposure risk to the trader. The system is suitable for use with any instrument with which reset is used, for example, but not limited to, FRA trading and interest rate options trading.

The invention claimed is:

1. A method for electronically trading forward rate agreements (FRAs) using a computer system comprising at least one computer, the computer system being programmed to carry out the method and storing respective books of FRA positions for at least one tenor for each of a plurality of traders, the book of a first one of the traders having a respective initial net position for each tenor of the first trader's book, the method comprising:
    the computer system executing one or more unilateral FRA trades between the first trader and one or more of the other traders so that the net position of the first trader's book, for at least one tenor, is changed; and
    the computer system subsequently selecting and executing a plurality of International Money Market (IMM) FRA trades on behalf of the first trader, the computer system making the selection as a function of the previously executed unilateral FRA trades and so as to offset at least some of the unilateral FRA trades thereby returning the first trader's net position, for at least one tenor, back to or at least closer to its initial net position.

2. The method of claim 1, wherein the computer system stores information concerning limitations under which one or more of the traders are willing to execute a trade and wherein the computer system uses the stored information to select which unilateral trades to execute.

3. The method of claim 2, wherein at least one of the limitations is the amount of credit the first trader grants to other traders and/or the amount of credit other traders grant to the first trader.

4. The method of claim 1, wherein the computer system selects, for each unilateral FRA trade, the quantity of two or more IMM FRA trades required to offset the FRA trade and executes the required IMM FRA trades as a function of such selection.

5. The method of claim 4, wherein the amount of IMM FRA trades required to offset each respective unilateral FRA trade is selected as a function of the date overlap between the contract dates of the respective unilateral FRA trade and the respective contract dates of the corresponding two or more IMM FRA trades required to offset the respective FRA trade.

6. The method of claim 5, wherein at least one of the IMM FRA trades is used to at least partially offset two or more of the unilateral FRA trades.

7. The method of claim 1, wherein at least one of the IMM FRA trades is used to at least partially offset two or more of the unilateral FRA trades.

8. The method of claim 1, wherein the computer system executes one or more unilateral FRA trades for each of two or more tenors of the first trader's book.

9. The method of claim 1, wherein the computer system executes one or more unilateral FRA trades for all tenors of the first trader's book.

10. The method of claim 1, wherein the computer system selects and executes a plurality of IMM FRA trades on behalf of the first trader so as to offset most of the unilateral FRA trades for at least one tenor and return the first trader's net position for those tenors back to or at least closer to their initial net position.

11. The method of claim 1, wherein the computer system selects and executes a plurality of IMM FRA trades on behalf of the first trader so as to offset all of the unilateral FRA trades for at least one tenor and return the first trader's net position for those tenors back to or at least closer to their initial net position.

12. A method for electronically trading forward rate agreements (FRAs) using a computer system comprising at least one computer, the computer system being programmed to carry out the method and storing respective books of FRA positions for at least one tenor for each of a plurality of traders, the method comprising:
   a first one of the traders submitting information concerning its respective book of FRA positions for at least one tenor, the first trader's book having a respective initial net position for each tenor of the first trader's book;
   storing the first trader's respective book of FRA positions in said computer system;
   the computer system executing one or more unilateral FRA trades between the first trader and one or more of the other traders so that the net position of the first trader's book, for at least one tenor, is changed; and
   the computer system subsequently selecting and executing a plurality of International Money Market (IMM) FRA trades on behalf of the first trader, the computer system making the selection as a function of the previously executed unilateral FRA trades and so as to offset at least some of the unilateral FRA trades thereby returning the first trader's net position, for at least one tenor, back to or at least closer to its initial net position.

13. The method of claim 12, wherein the computer system stores information concerning limitations under which one or more of the traders are willing to execute a trade and wherein the computer system uses the stored information to determine which unilateral trades to execute.

14. The method of claim 13, wherein at least one of the limitations is the amount of credit the first trader grants to other traders and/or the amount of credit other traders grant to the first trader.

15. The method of claim 12, wherein the computer system selects, for each unilateral FRA trade, the quantity of two or more IMM FRA trades required to offset the FRA trade and executes the required IMM FRA trades as a function of such selection.

16. The method of claim 15, wherein the amount of IMM FRA trades required to offset each respective unilateral FRA trade is selected as a function of the date overlap between the contract dates of the respective unilateral FRA trade and the respective contract dates of the corresponding two or more IMM FRA trades required to offset the respective FRA trade.

17. The method of claim 16, wherein at least one of the IMM FRA trades is used to at least partially offset two or more of the unilateral FRA trades.

18. The method of claim 12, wherein at least one of the IMM FRA trades is used to at least partially offset two or more of the unilateral FRA trades.

19. The method of claim 12, wherein the computer system executes one or more unilateral FRA trades for each of two or more tenors of the first trader's book.

20. The method of claim 12, wherein the computer system executes one or more unilateral FRA trades for all tenors of the first trader's book.

21. The method of claim 12, wherein the computer system selects and executes a plurality of IMM FRA trades on behalf of the first trader so as to offset most of the unilateral FRA trades for at least one tenor and return the first trader's net position for those tenors back to or at least closer to their initial net position.

22. The method of claim 12, wherein the computer system selects and executes the plurality of IMM FRA trades on behalf of the first trader so as to offset all of the unilateral FRA trades for at least one tenor and return the first trader's net position for those tenors back to or at least closer to their initial net position.

23. A method for electronically trading forward rate agreements (FRAs) and for generating a report showing trades made, the method being carried out by a computer system comprising at least one computer, the computer system being programmed to carry out the method and storing respective books of FRA positions for at least one tenor for each of a plurality of traders, the book of a first one of the traders having a respective initial net position for each tenor of the first trader's book, the method comprising:
   the computer system executing one or more unilateral FRA trades between the first trader and one or more of the other traders so that the net position of the first trader's book, for at least one tenor, is changed; and
   the computer system subsequently selecting and executing a plurality of International Money Market (IMM) FRA trades on behalf of the first trader, the computer system making the selection as a function of the previously executed unilateral FRA trades and so as to offset at least some of the unilateral FRA trades thereby returning the first trader's net position, for at least one tenor, back to or at least closer to its initial net position; and
   the computer system generating a report showing the trades made on behalf of the first trader.

24. The method of claim 23, wherein the computer system stores information concerning limitations under which one or more of the traders are willing to execute a trade and wherein the computer system uses the stored information to select which unilateral trades to execute.

25. The method of claim 24, wherein at least one of the limitations is the amount of credit the first trader grants to other traders and/or the amount of credit other traders grant to the first trader.

26. The method of claim 23, wherein the computer system selects, for each unilateral FRA trade, the quantity of two or more IMM FRA's required to offset the FRA trade and executes the required IMM FRA trades as a function of such selection.

27. The method of claim 26, wherein the amount of IMM FRA trades required to offset each respective unilateral FRA trade is selected as a function of the date overlap between the contract dates of the respective unilateral FRA trade and the respective contract dates of the corresponding two or more IMM FRA trades required to offset the respective FRA trade.

28. The method of claim 26, wherein at least one of the IMM FRA trades is used to at least partially offset two or more of the unilateral FRA trades.

29. The method of claim 23, wherein at least one of the IMM FRA trades is used to at least partially offset two or more of the unilateral FRA trades.

30. The method of claim 23, wherein the computer system executes one or more unilateral FRA trades for each of two or more tenors of the first trader's book.

31. The method of claim 23, wherein the computer system executes one or more unilateral FRA trades for all tenors of the first trader's book.

32. The method of claim 23, wherein the computer system selects and executes a plurality of IMM FRA trades on behalf of the first trader so as to offset most of the unilateral FRA trades for at least one tenor and return the first trader's net position for those tenors back to or at least closer to their initial net position.

33. The method of claim 23, wherein the computer system selects and executes a plurality of IMM FRA trades on behalf of the first trader so as to offset all of the unilateral FRA trades for at least one tenor and return the first trader's net position for those tenors back to or at least closer to their initial net position.

34. The method of claim 23, further comprising the step of sending the report to the first trader.

35. A method for electronically trading forward rate agreements (FRAs) and for generating a report showing trades made, the method being carried out by a computer system comprising at least one computer, the computer system being programmed to carry out the method and storing respective books of FRA positions for at least one tenor for each of a plurality of traders, the method comprising:
- a first one of the traders submitting information concerning its respective book of FRA positions for at least one tenor, the first trader's book having a respective initial net position for each tenor of the first trader's book;
- storing the first trader's respective book of FRA positions in said computer system;
- the computer system executing one or more unilateral FRA trades between the first trader and one or more of the other traders so that the net position of the first trader's book, for at least one tenor, is changed; and
- the computer system subsequently selecting and executing a plurality of International Money Market (IMM) FRA trades on behalf of the first trader, the computer system making the selection as a function of the previously executed unilateral FRA trades and so as to offset at least some of the unilateral FRA trades thereby returning the first trader's net position, for at least one tenor, back to or at least closer to its initial net position; and
- the computer system generating a report showing the trades made on behalf of the first trader.

36. The method of claim 35, wherein the computer system stores information concerning limitations under which one or more of the traders are willing to execute a trade and wherein the computer system uses the stored information to select which unilateral trades to execute.

37. The method of claim 36, wherein at least one of the limitations is the amount of credit the first trader grants to other traders and/or the amount of credit other traders grant to the first trader.

38. The method of claim 37, wherein the computer system selects, for each unilateral FRA trade, the quantity of two or more IMM FRA's required to offset the FRA trade and executes the required IMM FRA trades as a function of such selection.

39. The method of claim 38, wherein the amount of IMM FRA trades required to offset each respective unilateral FRA trade is selected as a function of the date overlap between the contract dates of the respective unilateral FRA trade and the respective contract dates of the corresponding two or more IMM FRA trades required to offset the respective FRA trade.

40. The method of claim 38, wherein at least one of the IMM FRA trades is used to at least partially offset two or more of the unilateral FRA trades.

41. The method of claim 35, wherein at least one of the IMM FRA trades is used to at least partially offset two or more of the unilateral FRA trades.

42. The method of claim 35, wherein the computer system executes one or more unilateral FRA trades for each of two or more tenors of the first trader's book.

43. The method of claim 35, wherein the computer system executes one or more unilateral FRA trades for all tenors of the first trader's book.

44. The method of claim 35, wherein the computer system selects and executes a plurality of IMM FRA trades on behalf of the first trader so as to offset most of the unilateral FRA trades for at least one tenor and return the first trader's net position for those tenors back to or at least closer to their initial net position.

45. The method of claim 35, wherein the computer system selects and executes a plurality of IMM FRA trades on behalf of the first trader so as to offset all of the unilateral FRA trades for at least one tenor and return the first trader's net position for those tenors back to or at least closer to their initial net position.

46. The method of claim 35, further comprising the step of sending the report to the first trader.

47. The method of claim 1, wherein the computer system both selects and executes the one or more unilateral FRA trades.

48. The method of claim 12, wherein the computer system both selects and executes the one or more unilateral FRA trades.

49. The method of claim 23, wherein the computer system both selects and executes the one or more unilateral FRA trades.

50. The method of claim 35, wherein the computer system both selects and executes the one or more unilateral FRA trades.

* * * * *